United States Patent
Hanson et al.

(10) Patent No.: US 6,842,335 B1
(45) Date of Patent: Jan. 11, 2005

(54) MULTIFUNCTIONAL COVER INTEGRATED INTO SUB-PANEL OF PORTABLE ELECTRONIC DEVICE

(75) Inventors: William Robert Hanson, Mountain View, CA (US); Yoon Kean Wong, Redwood City, CA (US)

(73) Assignee: palmOne, Inc., Milpitas, CA (US)

( * ) Notice: Subject to any disclaimer, the term of this patent is extended or adjusted under 35 U.S.C. 154(b) by 19 days.

(21) Appl. No.: 09/993,732

(22) Filed: Nov. 21, 2001

(51) Int. Cl.[7] .................................................. G06F 1/16
(52) U.S. Cl. ....................................... 361/683; 361/679
(58) Field of Search ................................. 361/679–686

(56) References Cited

U.S. PATENT DOCUMENTS

| | | | |
|---|---|---|---|
| 5,058,045 A | * 10/1991 | Ma ............................. | 364/708 |
| 5,835,863 A | * 11/1998 | Ikenouchi et al. .......... | 455/567 |
| 5,859,628 A | * 1/1999 | Ross et al. .................. | 345/173 |
| 5,983,073 A | * 11/1999 | Ditzik ......................... | 455/11.1 |
| 6,023,147 A | * 2/2000 | Cargin, Jr. et al. ......... | 320/114 |
| 6,390,855 B1 | * 5/2002 | Chang ......................... | 439/638 |
| 6,430,644 B1 | * 8/2002 | Luen et al. .................. | 710/300 |

OTHER PUBLICATIONS

Atkinson, (US 2001/0039571 A1), "System And Method For Facilitating Electronic Commerce Within Public Spaces", U.S. Patent Application Publication, 08/2001, U.S. Cl. 709/217, 12 pages and 5 figures.*

Misawa (US 2002/0196599 A1), "Arrangement of card slot in laptop computer", Dec. 26, 2002.*

* cited by examiner

Primary Examiner—Darren Schuberg
Assistant Examiner—Yean-Hsi Chang
(74) Attorney, Agent, or Firm—Wagner, Murabito, & Hao LLP (57) ABSTRACT

A cover for an opening in the housing of a portable electronic device that provides a function in addition to that of protecting the opening from dirt. The cover can be coupled to the housing so that it can move between a closed position within the housing's surface recess and an open position that allows access to the opening in the housing. In the closed position, the cover becomes part of the housing and the form factor of the device is generally unchanged. The cover can function as an antenna for wireless communication between the device and a network or access point, and it can contain circuitry for devices such as transmitter/receivers. The cover can also function as a display device, a speaker, or an alarm. Thus an existing cover that occupies space within the volume of a handheld device can be utilized for expanding the functionality of the device while generally retaining the current form factor of the device.

22 Claims, 12 Drawing Sheets

MULTIFUNCTIONAL COVER INTEGRATED INTO SUB-PANEL OF PORTABLE ELECTRONIC DEVICE

BACKGROUND OF THE INVENTION

1. Field of the Invention

The present invention relates to the field of portable electronic devices, such as personal digital assistants or palmtop computer systems. Specifically, the present invention relates to expanded functionality for a cover over an expansion port in a portable electronic device.

2. Related Art

A portable computer system, such as a personal digital assistant (PDA) or palmtop, is an electronic device that is small enough to be held in the hand of a user and is thus "palm-sized." By virtue of their size, portable computer systems are lightweight and so are exceptionally portable and convenient.

Wireless technologies are widely used for communication in modern society. In addition to personal cordless phones (e.g., cell phones) and pagers, portable computer systems (in particular PDAs) are more commonly being equipped with transceivers capable of broadcasting wireless signals (e.g., radio signals) over relatively long distances.

Technologies allowing wired connections between devices to be replaced with wireless ones, such as Bluetooth technology and IEEE Standard 802.11b and 802.11a, are becoming increasingly commonplace. These wireless communication technologies provide users with greater mobility and convenience. Mobility and convenience are enhanced as devices such as cell phones and PDAs are reduced in size. However, even as wireless communications devices are being made smaller and lighter, consumer preferences are driving manufacturers to further reduce the size and weight of such devices relative to the competition.

Manufacturers are also being driven by consumer preferences to provide portable devices with expanded memory, functionality and features, in order to enhance user convenience as well as to distinguish their devices from competing devices. Accordingly, manufacturers must turn to creative and innovative approaches to provide added functionality and features without increasing the size and weight of the device, and without eliminating existing features.

Thus it is desirable to maintain the form factor of these devices while expanding their capabilities. The present invention provides this advantage and

SUMMARY OF THE INVENTION

The present invention provides a design for expanding the functionality of portable electronic devices that will not increase the size or shape of the device. Specifically, the present invention provides expanded functionality to existing covers for openings in portable electronic devices.

The present invention pertains to a cover for an opening in the housing of an electronic device that performs a function in addition to protecting the contacts and circuitry contained within the opening in the device. A surface of the portable electronic device housing (e.g., the back side or bottom surface) contains a recessed opening with connectors for expansion devices. The recessed opening is enclosed with a cover to protect the enclosure from dust or dirt that might be harmful to the connectors and circuitry within the opening. The cover is coupled to the housing in a way that allows the cover to move between a first and second position or to be removed. Thus the cover, when stored within the surface recess, is flush with the portable electronic device housing and becomes part of the housing so that the current form factor (size, shape and appearance) of the electronic device is generally retained.

In one embodiment, the cover is removeably coupled to the housing, and the cover can be removed from the surface recess of the housing and replaced in the surface recess of the housing. In another embodiment, the cover is pivotably coupled to the housing, and the cover can be moved to various positions about the pivot point. In another embodiment, the cover is hingeably coupled to the housing, and the cover can be moved to various positions about the hinge or joint. In yet another embodiment, the cover is slideably coupled to the housing, and the cover can be moved to various positions by sliding it.

In one embodiment, the cover over the opening in the housing contains an antenna that is coupled to a transceiver by a suitable means. In one embodiment, connectors are contained in the opening in the housing of the electronic device for connecting the transceiver or other appropriate circuitry to the cover. In another embodiment, an expansion card connects to the device and contains connectors for further connecting to the cover.

In one embodiment, the cover contains a speaker. In another embodiment, the cover illuminates to apprise the user of an awaiting message, for example. In another embodiment, the cover vibrates for alerting the user of an awaiting message. In another embodiment, the cover contains an external display such as a date and time display. In yet another embodiment, the cover has an external connector for accepting additional expansion capability.

Therefore, in accordance with the present invention, covers over openings in electronic devices can be utilized for additional functionality. In addition, by using covers in this manner, the form factor (size, shape and appearance) of existing hand-held devices can be retained. These and other objects and advantages of the present invention will become obvious to those of ordinary skill in the art after having read the following detailed description of the preferred embodiments which are illustrated in the various drawing figures.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

The present invention is described primarily in the context of a portable computer system, often times referred to as a palm top, handheld or personal digital assistant. However, it is understood that the present invention is not limited to implementation in portable computer systems, but can also be implemented in other portable electronic devices such as cell phones, laptops, global positioning system devices, and the like. Indeed, aspects of the present invention can be implemented in any device, including desktop computer systems, in which it is necessary or desirable to maintain a certain form factor while introducing additional functionality.

Exemplary Portable Computer System With Multifunctional Port Cover

Figure 1:
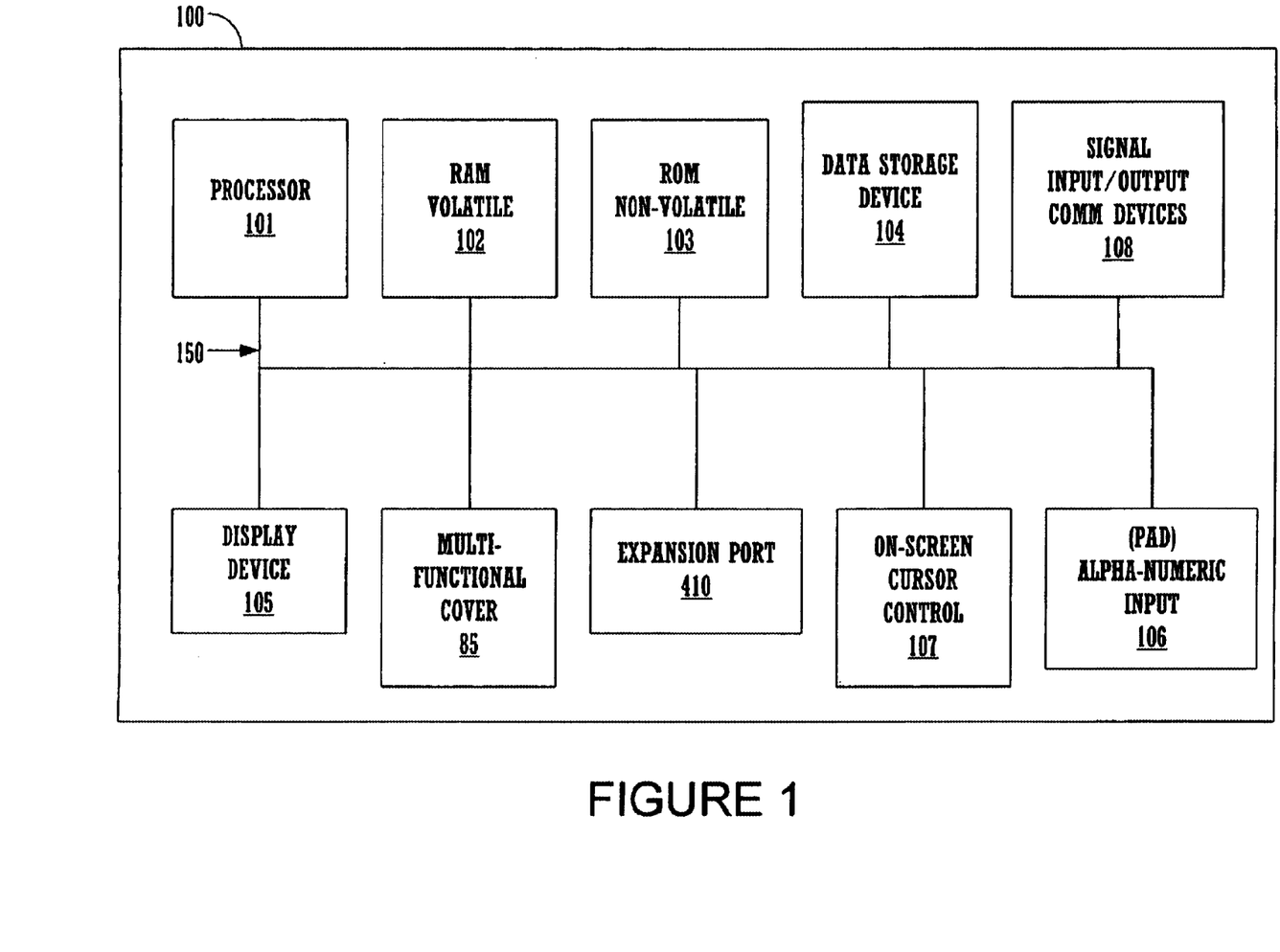
FIG. 1 is a block diagram of an exemplary computer system in accordance with one embodiment of the present invention.

FIG. 1 is a block diagram of one embodiment of a portable computer system 100 upon which embodiments of the present invention may be implemented. Portable computer system 100 includes an address/data bus 150 for communicating information, a central processor 101 coupled with the bus for processing information and instructions, a volatile memory 102 (e.g. random access memory, RAM) coupled with the bus 150 for storing information and instructions for the central processor 101 and a non-volatile memory 103 (e.g., read only memory, ROM) coupled with the bus 150 for storing static information and instructions for the processor 101. Computer system 100 also includes an optional data storage device 104 (e.g., memory stick) coupled with the bus 150 for storing information and instructions. Device 104 can be removable. As described above, computer system 100 also contains a display device 105 coupled to the bus 150 for displaying information to the computer user.

With reference still to FIG. 1, in one embodiment, computer system 100 also includes an optional signal transmitter/receiver device 108, which is coupled to bus 150 for providing a physical communication link between computer system 100, and a network environment. As such, signal transmitter/receiver device 108 enables central processor unit 101 to communicate wirelessly with other electronic systems coupled to a network.

In one embodiment, computer system 100 also includes an optional expansion port for use with various types of expansion cards. The expansion cards perform a variety of functions, depending upon the circuits that they contain. The expansion port 410 is usually embodied as an opening in the housing of computer system 100 with a cover 85 which is attached to the housing and which can be opened or removed to replace the expansion card. The function of the cover 85 is to protect the card and connectors that it covers from dust and dirt which could be harmful to the enclosed circuitry.

It should be appreciated that within one embodiment of the present invention, signal input/output communications device 108 is a transmitter/receiver (transceiver) that is coupled through bus 150 to cover 85. In one embodiment, cover 85 functions as an antenna that provides the functionality to transmit and receive information over a wireless communication interface. Cover 85 can, in other embodiments, function with the processor through bus 150 to generate alarms, function as a speaker, and display information.

Also included in computer system 100 of FIG. 1 is an optional alphanumeric input device 106 that in one implementation is a handwriting recognition pad. Alphanumeric input device 106 can communicate information and command selections to processor 101. Computer system 100 also includes an optional cursor control or directing device (on-screen cursor control 107) coupled to bus 150 for communicating user input information and command selections to processor 101.

Figure 2:
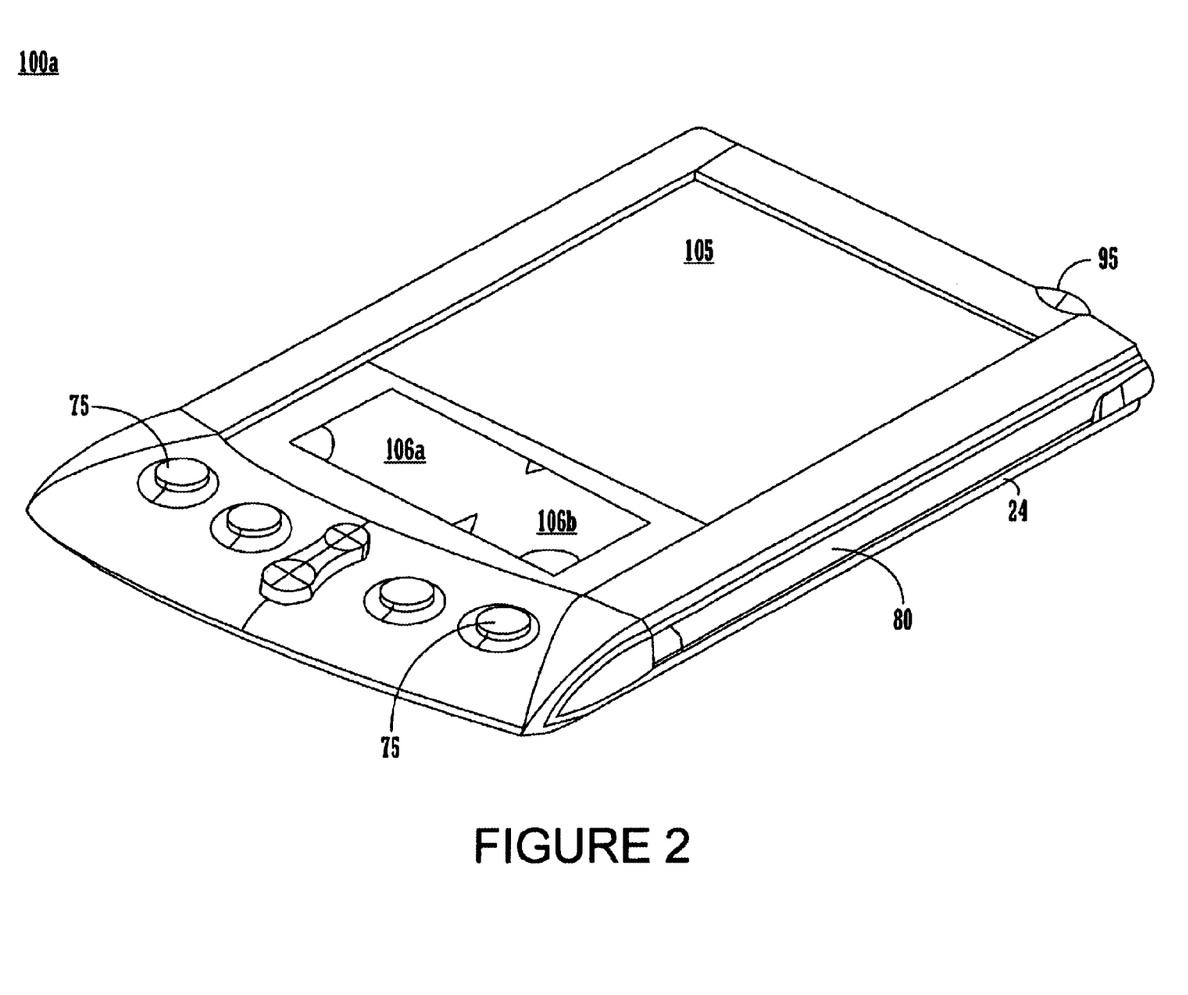
FIG. 2 is a topside perspective view of a portable electronic device in accordance with one embodiment of the present invention.

FIG. 2 is a perspective illustration of the top face 100a of one embodiment of the palmtop computer system 100 of the present invention. The top face 100a contains a display screen 105 surrounded by a bezel or cover. A removable stylus 80 is also shown. In this embodiment, top face 100a is formed with a recess 24 for holding stylus 80.

The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
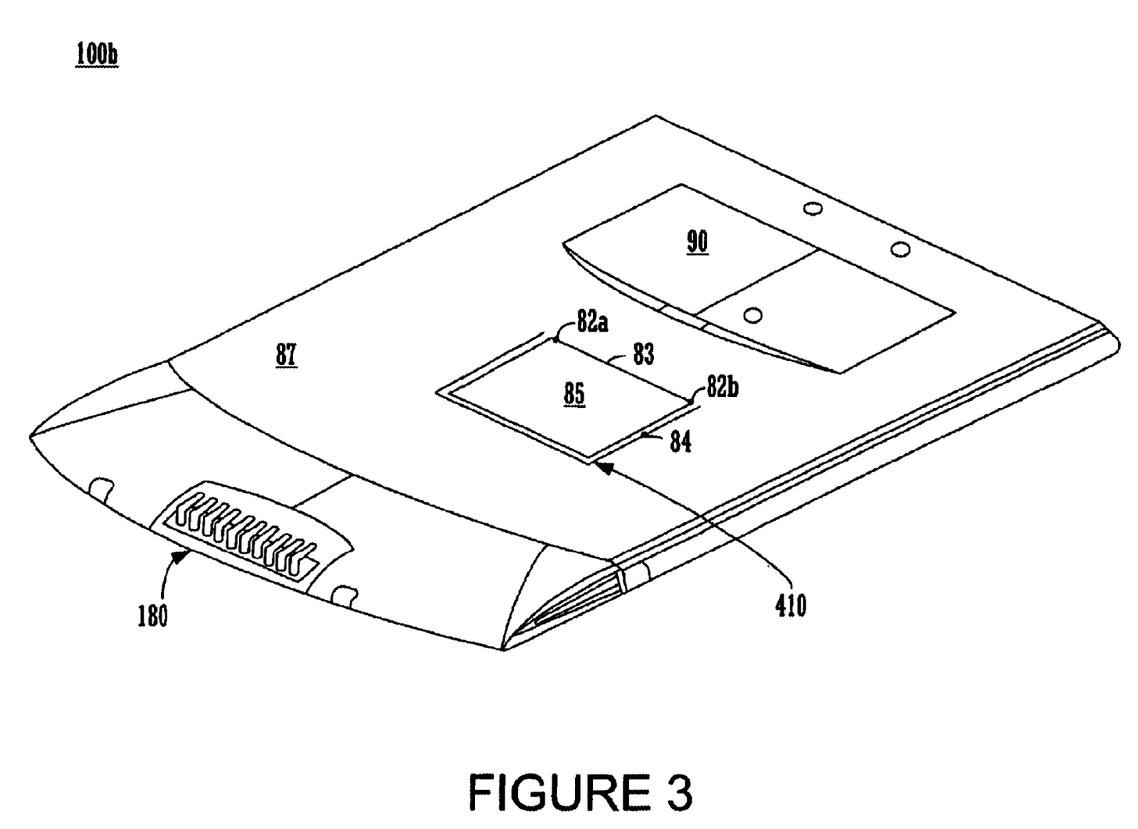
FIG. 3 is a bottom side perspective view of the portable electronic device of FIG. 2.

FIG. 3 illustrates the bottom side 100b of one embodiment of the palmtop computer system 100 that can be used in accordance with various embodiments of the present invention. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc. Also shown is a battery storage compartment door 90.

In the present embodiment, portable computer system 100 includes an expansion port 410 with a cover 85. In accordance with the present invention, cover 85 is coupled to the housing so that it can be moved or removed in order to access the expansion port beneath. As will be seen, cover 85 can also be implemented in other types of electronic devices in accordance with the present invention.

In FIG. 3, cover 85 is shown in the closed position. In the closed position, cover 85 is located within a recess 84 that is formed in the housing 87 of portable computer system 100. Recess 84 is of a size and shape to accommodate cover 85, such that cover 85 fits into recess 84 and does not protrude from housing 87. That is, cover 85 is flush with housing 87, such that the profile of housing 87 is not changed when cover 85 is in the closed position. Although cover 85 is illustrated as a rectangular shape in FIG. 3, it is appreciated that cover 85 is not limited to this shape. Also, recess 84 and cover 85 can be approximately the same size and shape, or they can be of different sizes and shapes provided that cover 85 fits within recess 84 when in the closed position. Thus, the current form factor (size, shape and appearance) of the hand-held device (e.g., portable computer system 100) is generally retained.

Still referring to FIG. 3, multifunctional cover 85 is coupled to the housing 87 in a way that allows the cover 85 to move between a first (closed) and a second (open) position. In one embodiment, cover 85 is hingeably coupled to the housing 87 using a hinge joint 83. In this embodiment, cover 85 can be rotated about hinge or joint 83 to a closed or open position. In a similar fashion, cover 85 can be hingeably coupled to housing 87 by pins 82a and 82b; in this embodiment, cover 85 can be rotated about pins 82a and 82b to a closed or open position. Pins 82a and 82b can also serve to provide an electrical connection between cover 85 and portable computer system 100.

In another embodiment, cover 85 of FIG. 3 can be pivotably coupled to housing 87 by a single pin (e.g., pin 82a) or by some other means that functions in a similar fashion. In this embodiment, cover 85 can be pivoted about the pivot point (e.g., pin 82a) to a stored or deployed position. In another embodiment, cover 85 is slideably coupled to the housing 87. In this embodiment, cover 85 is slid to a closed or open position along guides formed within recess 84.

In yet another embodiment, cover 85 is removeably coupled to the housing 87. For example, cover 85 can be slid along guides formed within the recess 84 and removed from housing 87 to allow maximum access to the expansion port 410.

Figure 4:
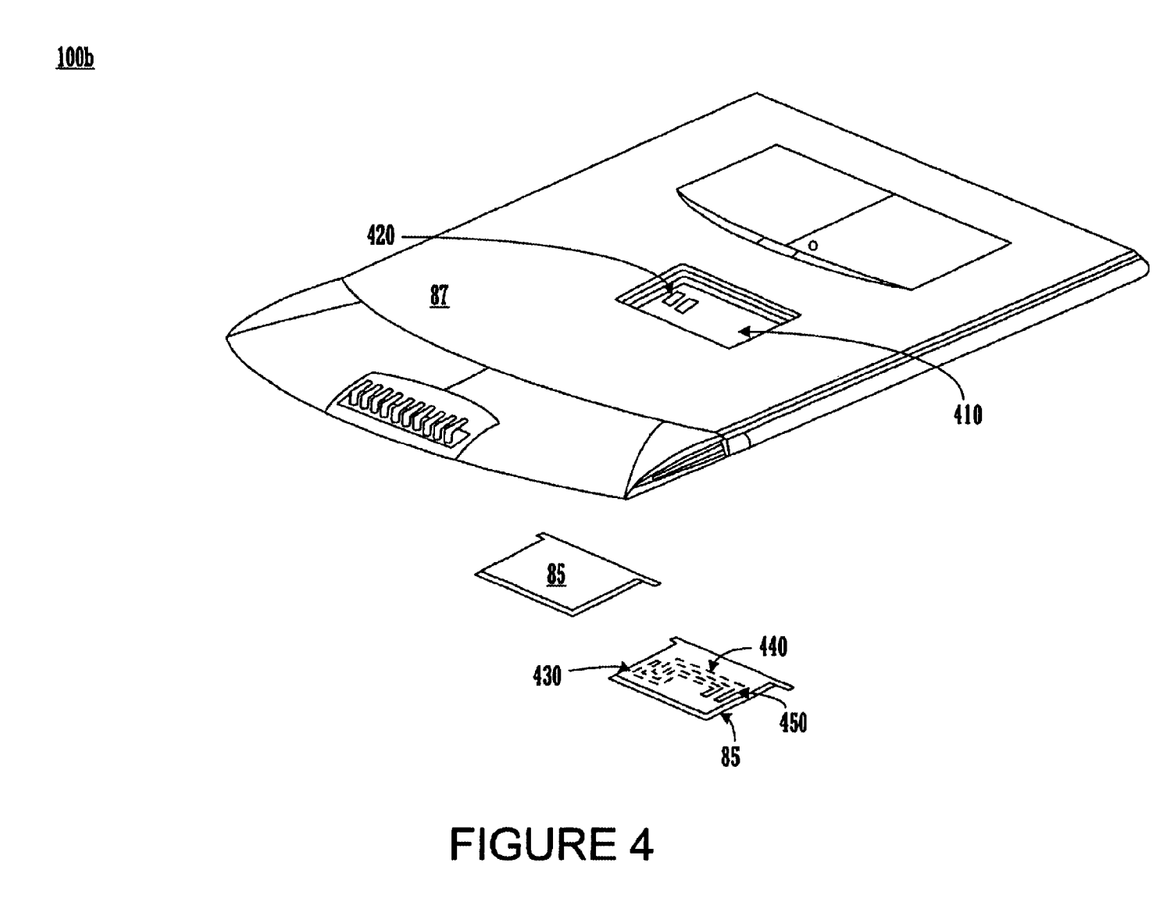
FIG. 4 is an exploded view of the electronic device of FIG. 3 according to one embodiment of the present invention.

FIG. 4 illustrates an exploded view of the bottom side 100b of the palmtop computer device of FIG. 3 in accordance with one embodiment. In this embodiment the housing 87 of the palmtop computer device contains an opening 410 which contains contacts 420 which are coupled to bus 150 of computer system 100 of FIG. 1. The opening 410 accommodates a cover 85.

The topside of the cover 85, according to one embodiment, is of the same material as the housing 87 and, when in the closed position, forms part of the housing 87.

Still referring to FIG. 4, the bottom side 430 of the cover 85 contains tracings for circuitry 440 and contacts. 450 for connecting with contacts 420 and for connecting with bus 150 of computer system 100 of FIG. 1. The circuitry in this embodiment could be that of an antenna for communicating with a transceiver for access to a wireless network or to other radio signals.

FIGS. 5A–5F and 6 are perspective drawings showing various embodiments of the present invention. Although the embodiments of FIGS. 5A–5F and 6 are separately described in order to more clearly illustrate certain aspects of the present invention, it is appreciated that combinations of these embodiments may also be used. For example, functions shown in FIGS. 5A–5F and 6 as being performed separately may be combined.

Figure 5A:
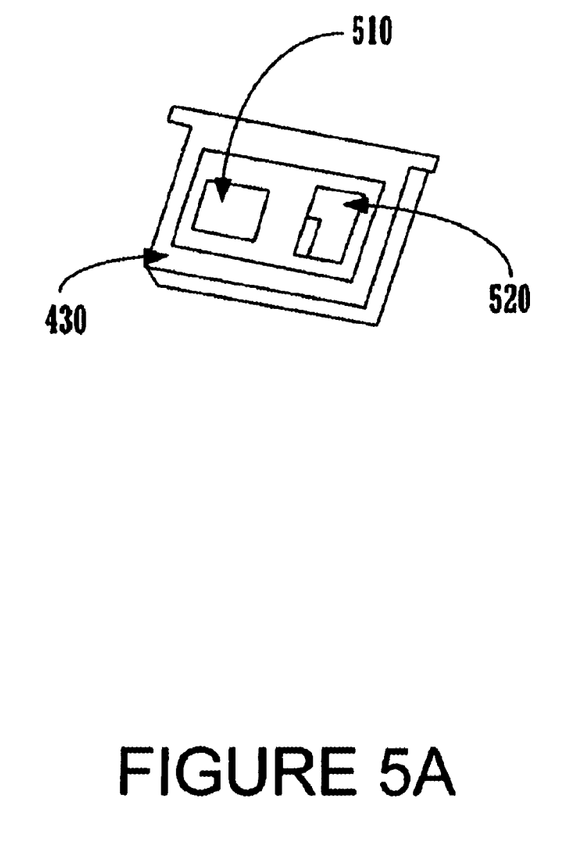
FIG. 5A illustrates a port cover containing an antenna and a printed circuit board according to one embodiment of the present invention.

Referring now to FIG. 5A, a bottom view of cover 85, according to one embodiment of the present invention, is illustrated. The bottom side 430 of cover 85, according to this embodiment, contains a component 510 such as an integrated circuit (ICU) containing circuitry (e.g., transmitter/receiver device circuitry) for supporting the particular function being performed by cover 85. Also illustrated is an antenna 520 for coupling to component 510 for wireless communication.

Figure 5B:
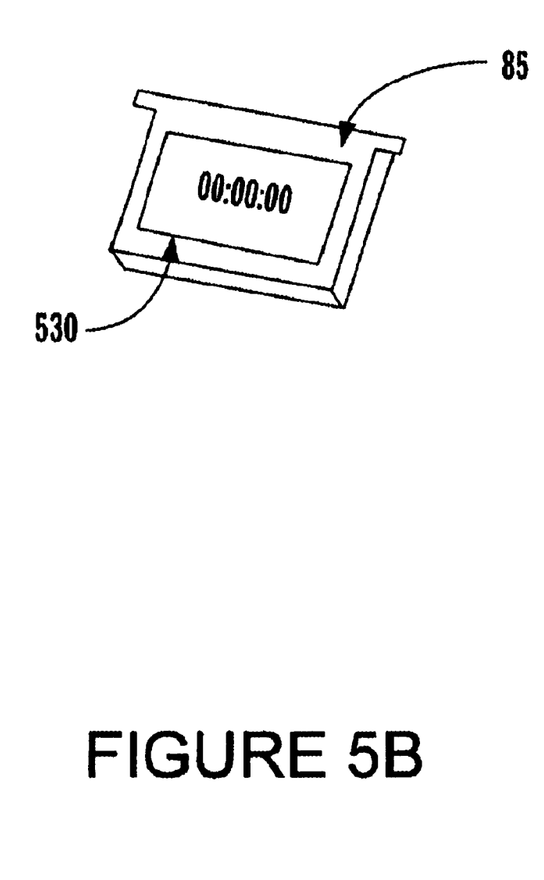
FIG. 5B illustrates a port cover containing a display device according to one embodiment of the present invention.

FIG. 5B illustrates a view showing the external surface of cover 85. In this embodiment, cover 85, in concert with circuitry as illustrated by component 510 of FIG. 5A, functions as a display device 530. Although in this implementation the display device 530 is illustrated as a digital clock, it is appreciated that display device 530 is not limited to this function, but can assume the functionality as defined by the PCB 510 and a preconfigured display.

Figure 5C:
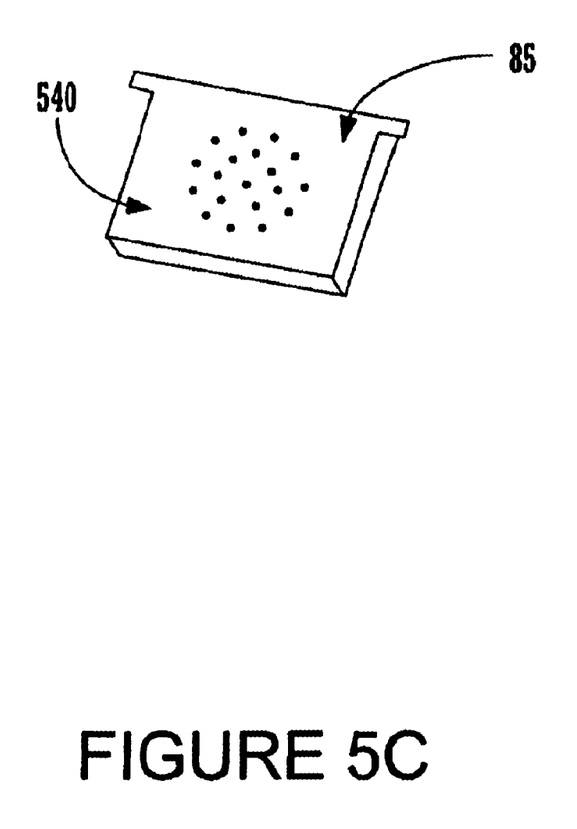
FIG. 5C illustrates a port cover as a speaker according to one embodiment of the present invention.

FIG. 5C illustrates a view showing the external surface of cover 85. In this embodiment, cover 85 functions as a speaker 540. In this implementation, a speaker 540 is contained within the cover 85 for converting radio signals or digital signals to sound.

Figure 5D:
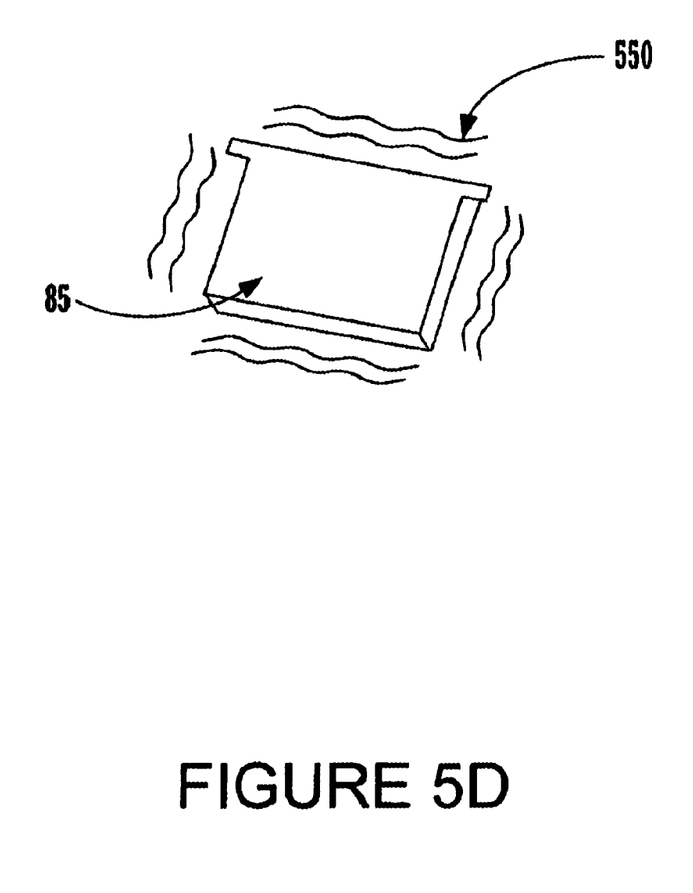
FIG. 5D illustrates a port cover as a vibrating alarm according to one embodiment of the present invention.

FIG. 5D illustrates a view showing the external surface of cover 85. In this embodiment, cover 85 functions as a vibrating alarm. According to the present implementation, upon receiving an alarm signal from a processor, cover 85 vibrates 550 to alert a user that an alarm message awaits. This alarm vibration 550 could be in response to a user preset time alarm, a battery-low alarm, or any of a multitude of alarms for which the processor is preconfigured to signal.

Figure 5E:
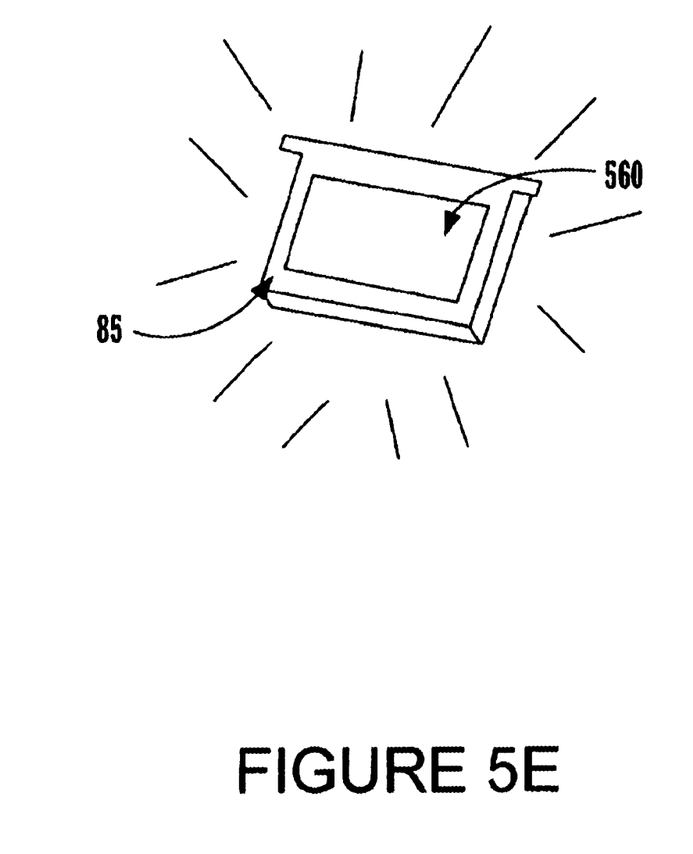
FIG. 5E illustrates a port cover as an illuminating alarm according to one embodiment of the present invention.

Referring to FIG. 5E, a view showing the external surface of cover 85 is presented. In this embodiment, cover 85 is illustrated as an illuminating alarm device. According to the present embodiment, an illuminating panel 560 is contained within the topside of cover 85. Upon receiving an alarm signal, the circuitry contained within the component 510 of FIG. 5A would cause the illumination of panel 560 for alerting a user of an alarm message.

Figure 5F:
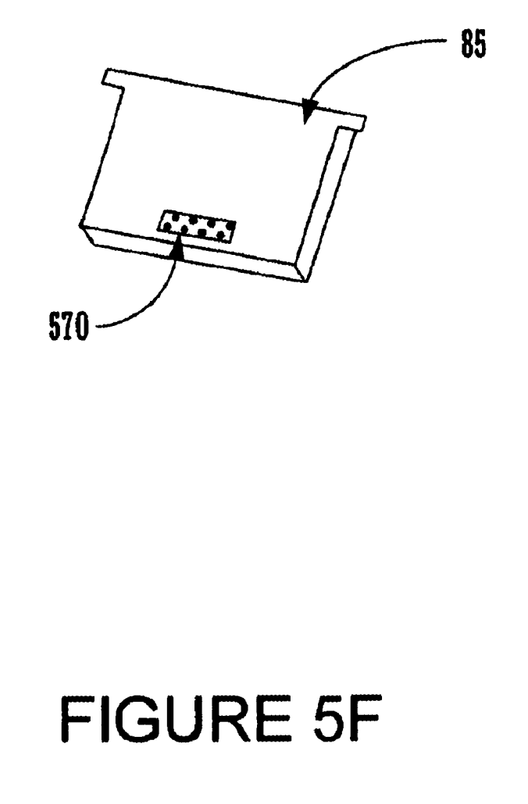
FIG. 5F illustrates a port cover with an expansion port according to one embodiment of the present invention.

FIG. 5F illustrates a view showing the external surface of cover 85. In this embodiment, cover 85 contains an expansion port 570 for coupling to an external expansion device or card.

Figure 6:
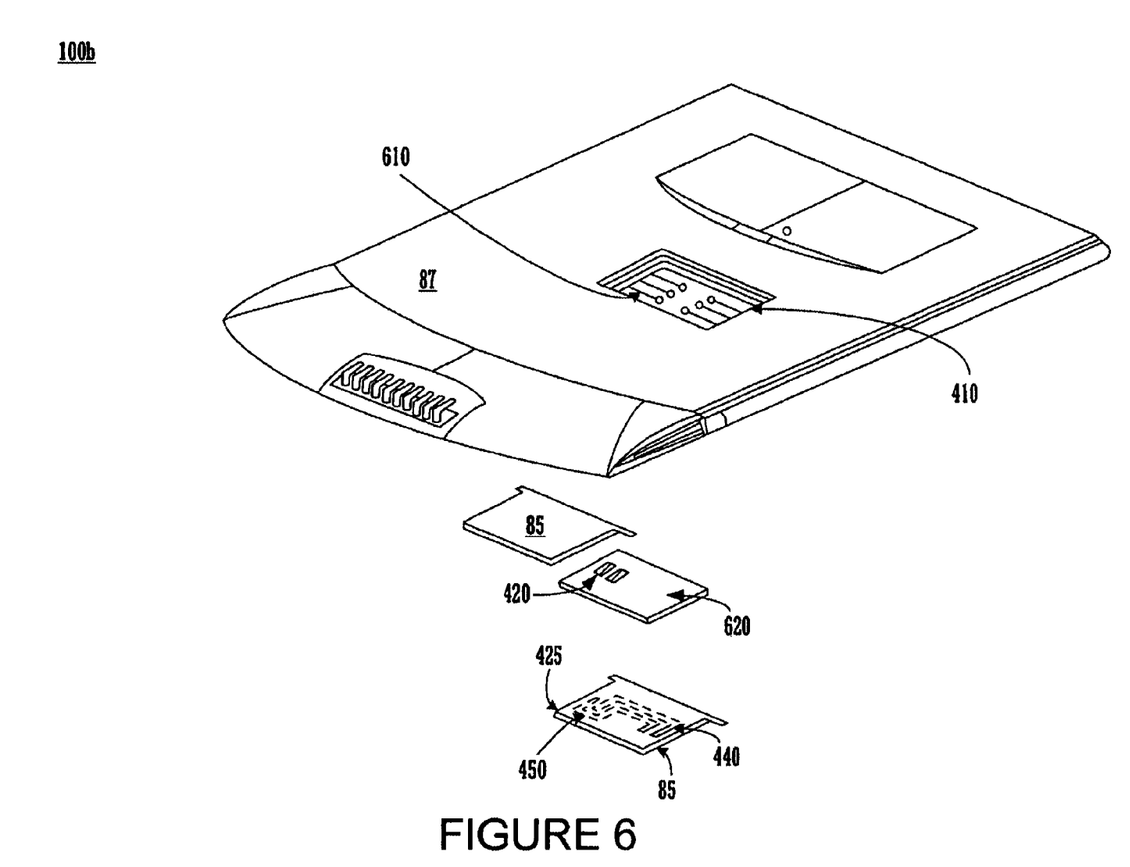
FIG. 6 is an exploded view of the electronic device of FIG. 3 illustrating the cover connected to the electronic device through an expansion card in accordance with one embodiment of the present invention.

FIG. 6 is an exploded view of the bottom view 100b of the palm top computer device 100 of FIG. 3, according to one embodiment of the present invention. In this embodiment, the housing 87 of the palmtop computer device 100 contains an opening 410 which contains contacts 610 which are coupled to bus 150 of computer system 100 of FIG. 1. The opening 410 accommodates one or more expansion cards 620 and a removable cover 85 according to the present embodiment. The topside (external surface) of the cover 85, according to one embodiment, is of the same material as the housing 87 and, when in the closed position, forms part of the housing 87.

The contacts 610 are for receiving one or more cards 620 such as, but not limited to, memory expansion cards, Secure Identity Module (SIM) cards or I/O cards (e.g., Bluetooth cards or IEEE 802.11 cards). Card 620 has contacts 420 that connect to contacts 440 on the backside 425 (internal surface) of cover 85. According to one embodiment, card 620 is a radio-signal-range wireless transceiver such as a Bluetooth or IEEE 802.11b, and the circuitry 450 in the cover 85 contains an antenna of the appropriate impedance for the frequency of the device of card 620. In another embodiment, card 620 is an IEEE 802.11a card and the cover 85 contains an antenna of required impedance for the frequency of the IEEE 802.11a card. According to one embodiment, the cover 85 is removable and can be replaced by a cover 85 of the same dimensions but having different functionality, In order to distinguish the functionality of a removable cover 85, according to one embodiment, the cover 85 is color coded to delineate functionality.

It is appreciated that the present invention is not limited to functions illustrated in FIGS. 5A–5F and 6. Furthermore, it is appreciated that the functions described above may be performed by cover 85 independently of portable computer system 100 or in combination with portable computer system 100. For example, returning back to FIG. 5B, cover 85 may receive a clock signal from portable computer system 100, or cover 85 may comprise its own clock.

Figure 7:
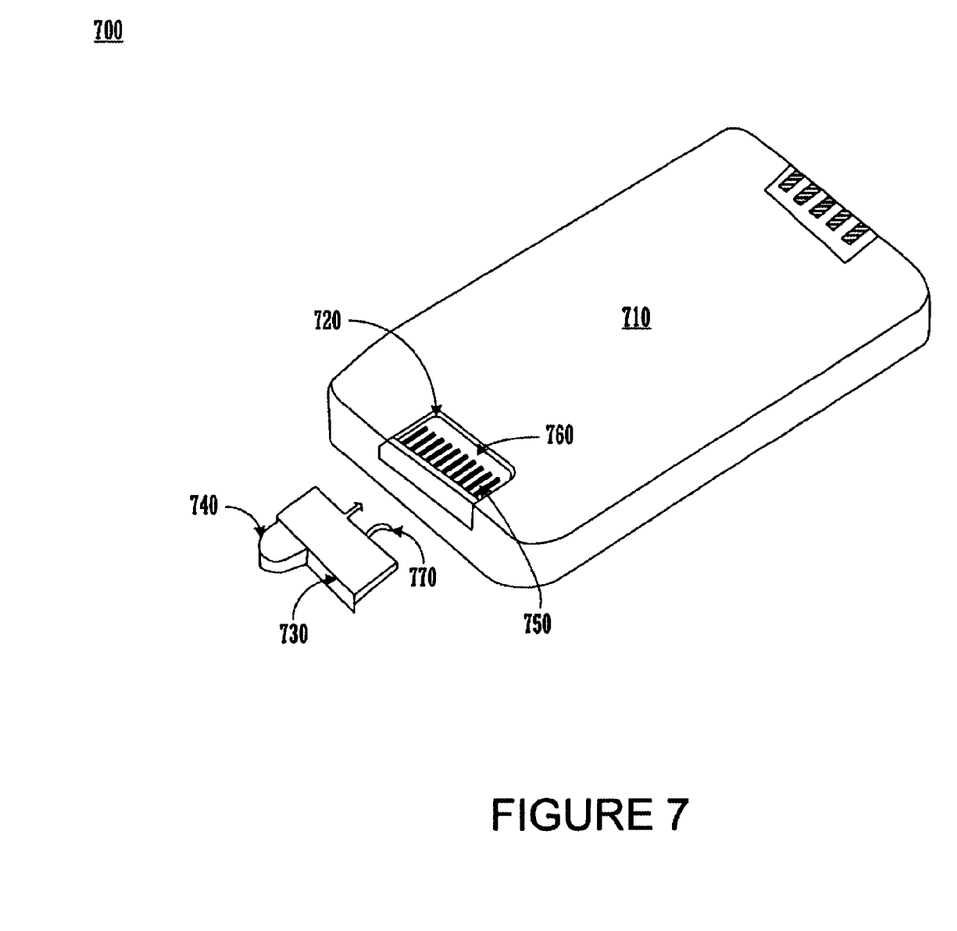
FIG. 7 is an exploded back side perspective view of a portable electronic device with an edge opening and cover in accordance with one embodiment of the present invention.

Referring now to FIG. 7, an exploded view of a handheld electronic device 700 is shown, according to another embodiment of the present invention. Device 700 is contained in housing 710. At the edge of housing 710 is an expansion port 720 containing connectors 750 and contacts 760. There is a removable cover 730 which has a small protrusion 740 and contacts 770 which connect to contacts 760 within the expansion port 720 to hold the cover in place when in the closed position. Contacts 760 also connect to the bus of device 700. The cover 730 and protrusion 740 are of the same material as the housing 710 and fit flush with the housing 710 when in the closed position. In this embodiment, the cover 730 contains an antenna within the protrusion 740 that connects to the bus of device 700 through contacts 770 when in the closed position.

The present invention, a cover for an opening in the housing of a portable electronic device that provides a function in addition to that of protecting the opening from dirt, has the advantage of expanded functionality without appreciably altering the form factor of the device. The cover can be removed, according to one embodiment, and can be interchanged with another cover of the same dimensions but with different functionality. For example, a device having a Bluetooth transceiver and a cover functioning as a Bluetooth-compatible antenna could have the transceiver changed to IEEE 802.11a and the cover could easily be replaced with one that functions as an IEEE 802.11a-compatible antenna. A cover that functions as a vibrating alarm could easily be replaced with one that includes a digital clock display. The covers can have multiple functions. In one example, a cover functioning as an antenna could also contain the circuitry for a transceiver. In another example, a cover functioning as a speaker could also vibrate to issue an alarm. In order to differentiate the functionality of the covers, they can be coloring coded, silk screened with identifying labels or otherwise labeled for identification of functionality.

Thus, the present invention provides a design for expanding the functionality of portable electronic devices that will not increase the size or shape of the device. Specifically, the present invention provides expanded functionality to existing covers for openings in portable electronic devices.

The preferred embodiment of the present invention, an electronic peripheral device integrated into an expansion port cover of a portable electronic device, is thus described. While the present invention has been described in particular embodiments, it should be appreciated that the present invention should not be construed as limited by such embodiments, but rather construed according to the below claims.

What is claimed is:

1. A personal digital assistant comprising:
   a housing having an opening for inserting an expansion card within the volume of said housing;
   a bus disposed within said housing;
   a processor disposed within said housing and coupled to said bus;
   a connector disposed within said opening, said connector coupled to said bus and for connecting with said expansion card;
   a cover for said opening, said cover coupleable to said housing, wherein said cover performs a first function of enclosing said opening, said expansion card and said connector, and wherein said cover further performs a second function in addition to said first function.

2. The personal digital assistant of claim 1 wherein said cover is removeably coupled to said housing.

3. The personal digital assistant of claim 1 wherein said cover is pivotably coupled to said housing.

4. The personal digital assistant of claim 1 wherein said cover is slideably coupled to said housing.

5. The personal digital assistant of claim 1 wherein said cover is hingeably coupled to said housing.

6. The personal digital assistant of claim 1 wherein said cover comprises an antenna.

7. The personal digital assistant of claim 1 wherein said cover comprises a speaker.

8. The personal digital assistant of claim 1 wherein said cover illuminates for alerting a user.

9. The personal digital assistant of claim 1 wherein said cover vibrates for alerting a user.

10. The personal digital assistant of claim 1 wherein said cover comprises external connectors for coupling to an external device.

11. The personal digital assistant of claim 1 wherein said cover comprises a display.

12. A device comprising:
    circuitry for coupling said device to personal digital assistant; and
    circuitry for performing a function synergistically with a function performed by said personal digital assistant;
    wherein said device is sized and shaped to serve as a cover for an expansion card port, wherein said device fits into an opening in a housing of said personal digital assistant, wherein said device resides within the volume of said housing and performs a first function of enclosing said opening and performs a second function synergistically with said function performed by said personal digital assistant.

13. The device of claim 12 wherein said device is removeably coupled to said housing.

14. The device of claim 12 wherein said device is pivotably coupled to said housing.

15. The device of claim 12 wherein said device is slideably coupled to said housing.

16. The device of claim 12 wherein said device is hingeably coupled to said housing.

17. The device of claim 12 wherein said device comprises an antenna.

18. The device of claim 12 wherein said device comprises a speaker.

19. The device of claim 12 wherein said device illuminates for alerting a user.

20. The device of claim 12 wherein said device vibrates for alerting a user.

21. The device of claim 12 wherein said device comprises external connectors for receiving expanded functionality.

22. The device of claim 12 wherein said device comprises a display.

* * * * *